United States Patent [19]

Trumbull

[11] Patent Number: 4,889,423

[45] Date of Patent: Dec. 26, 1989

[54] CONVERSION OF HIGH TO LOW FRAME RATE MOTION PICTURE FILMS

[75] Inventor: Douglas Trumbull, Santa Monica, Calif.

[73] Assignee: Showscan Film Corporation, Culver City, Calif.

[21] Appl. No.: 879,037

[22] Filed: Jun. 26, 1986

[51] Int. Cl.⁴ ............................................. G03B 19/18
[52] U.S. Cl. ...................................... 352/46; 352/239
[58] Field of Search ............................ 352/44, 46, 239

[56] References Cited

U.S. PATENT DOCUMENTS 1,815,455  7/1931  Waller ................................... 352/46
3,511,567  5/1970  Dejoux ................................. 352/46

Primary Examiner—Monroe H. Hayes
Attorney, Agent, or Firm—Freilich, Hornbaker, Rosen & Fernandez

[57] ABSTRACT

A method is described for converting a strip of film designed for showing at 60 fps (frames per second) to a film that can be shown at 24 fps. Instead of forming the 24 fps film so it alternately contains every second and every third frame of the 60 fps film, each frame of the 24 fps film includes two distinct overlapping successive images of the 60 fps film.

7 Claims, 1 Drawing Sheet

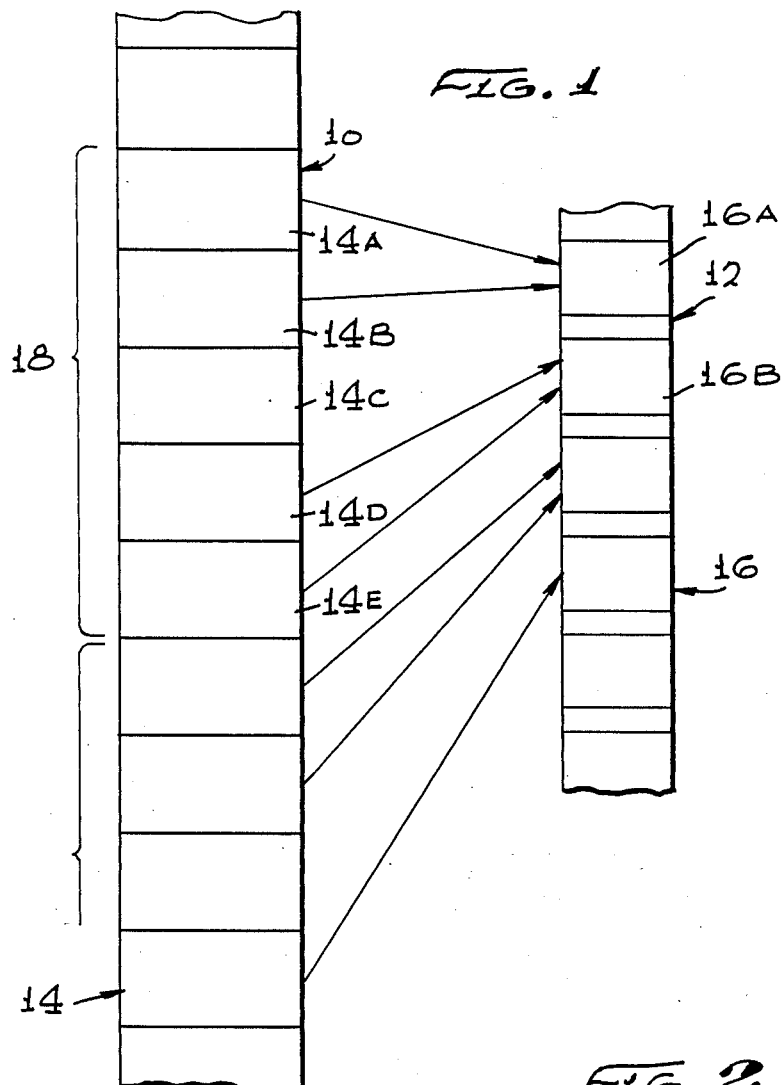
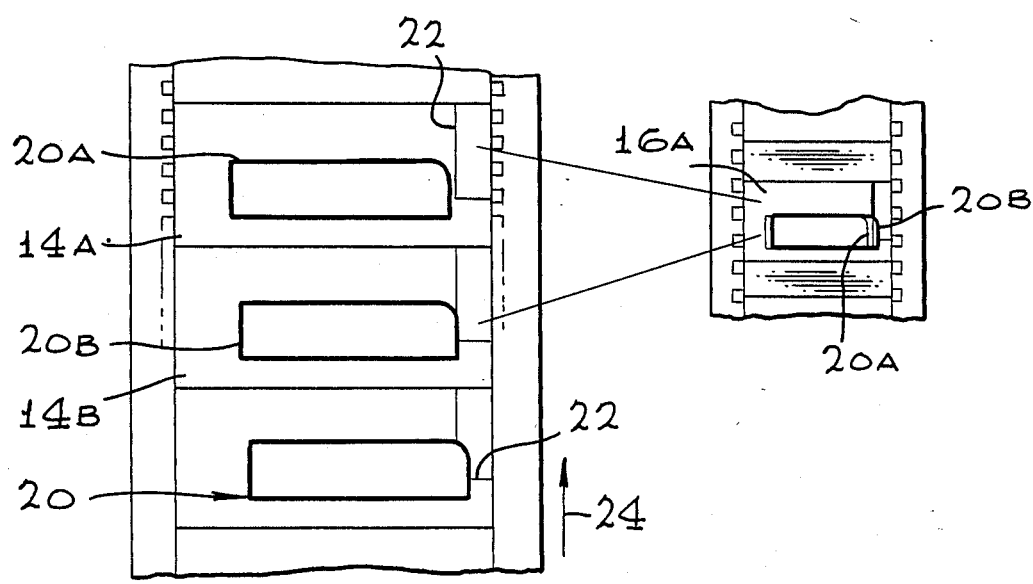

CONVERSION OF HIGH TO LOW FRAME RATE MOTION PICTURE FILMS

BACKGROUND OF THE INVENTION

Almost all present motion picture theaters project 24 new frames per second on the screen, with each frame being interrupted once. This results in showing 48 images per second (with pairs of successive images being identical), which avoids the sensing of flickering by the audience. It has been found that greater vividness and realism are achieved by projecting far more than 24 new frames per second. For example, U.S. Pat. No. 4,477,160 describes a motion picture system wherein 60 new frames per second are projected onto a screen. In order to permit a motion picture taken with a camera at a high frame rate such as 60 fps, to be shown in a conventional motion picture theater which can only operate at 24 fps, a conversion of the 60 fps to the 24 fps rate is required.

One simple way of converting a strip of film intended for showing at a high frame rate such as 60 fps to a film for projecting at a low frame rate such as 24 fps, is to alternately copy every second and every third frame of the 60 fps film onto areas of the 24 fps film. However, even for film frames of the same size, this results in the potential loss of two-thirds of the information available on the 60 fps film. A conversion technique which retains more of the information available in the high frame rate film, when converting it to a lower frame rate, would result in a superior lower frame rate film and a superior motion picture image when the lower frame rate film is projected on a screen.

SUMMARY OF THE INVENTION

In accordance with one embodiment of the present invention, a low frame rate film and a method for producing it are provided, which embody a considerable amount of information available in a higher frame rate film from which the lower frame rate film is produced. At least some of the frames of the low frame rate film, each includes the overlapping images on a pair of successive frames of the high frame rate film. The image of the trailing frame along the direction of film movement, of the pair of high rate frames, represents more than half of the total exposure of the corresponding low rate frame. The image of the leading high rate frame represents less than half of the intensity of the image on the frame of the low rate film.

In one situation, the high frame rate film contains frames taken by a camera at 60 frames per second, while the low frame rate film is to be projected at 24 frames per second. Of each group of five successive frames of the 60 fps film, the images on the first and second frames are applied to one frame area of the 24 fps film. The images on the fourth and fifth frames are applied to the next successive frame along the 24 fps film. The image on the third frame of each group of five is not transferred to the 24 fps film.

The novel features of the invention are set forth with particularity in the appended claims. The invention will be best understood from the following description when read in conjunction with the accompanying drawings.

DESCRIPTION OF THE DRAWINGS

FIG. 1 is a plan view of portions of two strips of film, indicating the method of transference of the images they retain.

FIG. 2 is a more detailed view of the films of FIG. 1.

FIG. 3 is an enlarged view of a portion of a film of FIG. 2.

DESCRIPTION OF THE PREFERRED EMBODIMENT

FIG. 1 illustrates two strips of film 10, 12, the first of 70 mm film and the second of 35 mm film, which represent substantially the same motion picture. However, the film 10 was taken by a camera at a frame rate of 60 fps (frames per second) for showing in theaters with special equipment that can project film at such a high frame rate. The other film 12 is formed for use in typical commercial motion picture theaters which have projectors that can project film at a rate of 24 fps, with each frame being briefly interrupted to project 48 "flickers" per second. While the film 10 is most vivid when projected at 60 fps, a 24 fps version is created from it, for showing in the more numerous theaters which can project at only 24 fps. The most obvious way of converting the images on the high rate frames 14 to the film 12, is to use one frame 14 of the high rate film to expose one corresponding frame 16 of the low rate film, with every other and then every two other frames being skipped. While such an approach can be used, it results in the loss of much of the information available on the 60 fps film.

In accordance with the present invention, each frame 16 of the low frame rate film 12 is produced so it includes information from two successive frames 14 of the high frame rate film 10. For example, the image in the area of the low rate frame 16A is produced so one portion of its exposure includes the image of the frame 14A and the other portion of its exposure includes the image on the next successive high rate frame 14B. The next low rate frame 16B includes the two images on two successive frames 14D, 14E of the high rate film. For conversion of a 60 fps film to a 24 fps, each group 18 of five frames of the 60 fps film are converted into two frames of 24 fps film. The image on one frame 14C of the 60 fps film is not used to expose any frame of the 24 fps film. Thus, each 24 fps frame 16A, 16B is devoid of the image on frame 14C (i.e., frames 16A, 16B contain only those portions of the image on frame 14C that is common to the pairs 14A, 14B or 14D, 14E of frames).

It might be thought that more information could be transferred to the 24 fps film 12 by including the image 14C on either or both of the frames 16A, 16B. However, such inclusion generally does not enhance the motion picture image created by the 24 fps film 12. Instead, the inclusion of more than two frames of the 60 fps film onto one frame of the 24 fps film can result in loss in apparent sharpness of the image for moving objects in the motion picture image. This can occur where the 24 fps film is of high quality so that the pair of images on each frame such as 16A are both sharp. Each frame such as 16A then includes the amount of motion which occurs in no more than about one-twenty-fourth of a second. If three or more images of the film 10 were transferred to a single frame such as 16A, then each frame would include motion lasting for more than one-twenty-fourth of a second, which could detract from the sharpness of the image for moving objects.

In actual film production, each 24 fps film 12 is produced from a 24 fps negative. While the 24 fps negative could be produced from the 60 fps film 10, it is more commonly produced from an interpositive which is produced from the original 60 fps negative. However, the images remain throughout the various stages of production, so that it can be said that each image on a low rate film frame such as 16A includes the images on two high rate film frames such as 14A, 14B.

The total exposure or intensity of the image on a frame such as 16A includes only a portion of the intensity of the images on each of the frames 14A, 14B. Of course, if the full intensity of each frame 14 were included, the frame 16 would be overexposed. Instead of transferring only one-half of the intensity of the image on each 60 fps frame 14A, 14B applicant finds that a more vivid image is produced by emphasizing the image in the trailing 60 fps frame 14B over the image of the leading frame 14A of the pair. Figure 2 shows a scene wherein a moving object 20 in the image, such as a locomotive, is moving relative to a stationary object 22 such as a train station. The film moves in the direction of arrow 24 during the exposure or "taking" of the film in a camera, and during the showing of the film from a projector. Thus, the frame 14A contains the leading image and the frame 14B contains the trailing image, along the direction of film movement. If the images 20A and 20B of the locomotive were seen to be racing each other, the image 20B would be seen to be 'ahead' the other image 20A, which is just the reverse of the situation for film movement in the camera and projector (applicant ignores the rare instances where scenes are to be shown in reverse). Applicant emphasizes the trailing image of frame 14B. Thus, in the frame 16A, the trailing image 20B constitutes more of the intensity of the image than the leading image 20A. Applicant finds that, by emphasizing the trailing image 20B, that the most forward edge of the moving object is emphasized as compared to the background, and it results in an apparently sharper image of the moving object. Thus, the 24 fps strip of motion picture film has frames representing an object in motion, with each frame such as 16A including two sharp images (insufficient blur to connect the two images), where the image 20B representing the object at a slightly later time in its movement is more intense (higher contrast with surroundings) than the image 20A representing the object at a slightly earlier time.

In exposing the frame area of the 24 fps frame 16A, applicant opens the shutter for the image on frame 14A for 150°, and opens the shutter from the trailing frame 14B for 25°. As a result, the lagging image from frame 14B represents about 83% or about five-sixths of the total intensity of the image on frame 16A, while the image o the leading frame 14A represents about 17% or about one-sixth of the intensity of the image on the frame 16A.

It is desirable that the image of the lagging, or trailing, frame such as 14B represent at least two-thirds of the total exposure of each low rate frame 16A to emphasize it over the leading frame 14A. It is even more preferable that the image of the lagging frame form at least three times as much of the exposure of the low rate frame, as does the leading frame.

In commercial prior art 24 fps systems, where the camera exposed film at 24 fps and a projector showed the film at 24 fps, care had to be taken when objects in motion were to be photographed. It was necessary to assure that rapidly moving objects (e.g., moving at a rate of over about one screen width per 5 seconds) were blurred, to avoid apparent jerkiness. The shutter was open about 180° to 200° in every 360°, or in other words about half the time, so each frame was exposed about (1/48th second). If the shutter were open for perhaps 10° to 50° in bright lighting conditions, (1/1000th second to 1/200th second), then each frame would be sharp. If such a sharp motion picture of a rapidly moving small object is shown at 24 fps, then a human observer observes two objects, all of which detracts from the smoothness of the apparent motion picture.

Applicant has found that when part of two successive 60 fps frames are combined, then much greater smoothness of action results. For example, if a ball is moving across a 48 foot wide screen at a rate of 24 feet per second, then at a frame rate of 24 fps, the successive images of the ball will be spaced one foot apart. When two successive 60 fps frames are combined, then the images of the ball will be spaced 0.4 feet apart on ⅔rd's of the images, and will be spaced 0.8 feet apart on ⅓rd of the images. Where the frames are shown at 60 fps, no apparent jerkiness occurs. When the 60 fps frames are combined as described above, sharp images of rapidly moving objects result in much less jerkiness, and yet the increased sharpness produces a more realistic motion picture image. It may be noted that when the original 60 fps film is projected at 60 fps, no apparent blurring occurs for rapidly moving sharp objects; however, such projection requires special equipment.

Thus, the invention provides a method for converting a high rate motion picture strip of film to a lower rate motion picture film, in a manner that enhances the image of the low rate film. This is accomplished by transferring a portion of the intensity of the image on each of two successive frames of the high rate film onto each frame area of the low rate film. The lagging frame of a pair of frames of the high rate film is emphasized, so that it constitutes most of the image on each low rate frame, and preferably at least two-thirds thereof. The method is particularly useful for conversion of high rate films taken at a rate of at least 48 fps to low rate film to be projected at 24 fps. For 48 fps film the images on every pair of adjacent high rate frames is transferred to one low rate frame, while for high rate film taken at 60 fps every fifth frame is not used.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for converting a high rate motion picture strip of film containing a series of frames taken by a camera at a predetermined high frame rate of at least 48 frames per second to a low rate motion picture strip of film useful for projection at 24 frames per second, comprising:

forming at least some of said frames of said low rate film so a first frame thereof includes the overlapping images on a first pair of successive frames of said high rate film, and a next successive frame on said low rate film includes the overlapping images of a second pair of successive frames of said high rate film.

2. The method described in claim 1 wherein:

said high rate strip of film advances in a predetermined direction during the time it was taken by a camera; and the image of the trailing frame of the two successive high frame rate frames of each pair which form one low frame rate film frame, is present in a greater intensity than the leading frame along the direction of film movement.

3. The method described in claim 2 wherein:

said trailing frame represents more than two-thirds of the total exposure of each low frame rate film frame.

4. The method described in claim 1 wherein:

said first film contains frames taken by a camera at a frame rate of 60 frames per second;

said step of forming includes exposing the first and second frames of each group of five frames of the 60 fps film onto one frame of the 24 fps film, and exposing the fourth and fifth frames of each group of five frames onto a next successive frame of the 24 fps film, without transferring the third frame of each group of five onto any frame of the 24 fps film.

5. A low rate motion picture strip of film which has multiple film frames and which is designed for projection at a low frame rate, the low rate motion picture strip of film being useful to project substantially the motion picture contained on a high rate motion picture strip of film which represents multiple high rate frames taken at a high frame rate which is greater than said low frame rate, with each high rate frame representing an image, comprising:

a low frame rate motion picture strip of film which includes a multiplicity of low rate frames positioned successively along the length of the low rate strip of film, a plurality of said low rate frames including one frame formed solely of the distinct images of two successive frames of said high frame rate film, and a next successive low rate frame formed of the distinct images of two other successive frames of said high rate film.

6. The strip described in claim 5 wherein:

each pair of successive high rate frames includes a leading frame and a lagging frame, with respect to the normal direction of film strip movement during the taking and projection of the strip;

each of said plurality of low rate frames includes at least twice as much exposure of the lagging frame as of the leading frame, of the corresponding two successive frames of said high rate film strip.

7. A method for converting a fast frame rate motion picture containing a series of frames taken by a camera at a predetermined high frame rate of 60 fps (frames per second), to a low rate motion picture strip of film useful for projection at 24 fps, comprising:

exposing the first and second frames of each group of five frames of the 60 fps film onto one frame of the 24 fps film, and exposing the fourth and fifth frames of each group of five frames onto a next successive frame of the 24fps film, the second frame representing most of the intensity of the image of said one frame of the 24 fps film, and said fifth frame representing most of the intensity of image of said next successive frame of the 24 fps film.

* * * * *